United States Patent [19]

Kato et al.

[11] Patent Number: 4,629,351

[45] Date of Patent: Dec. 16, 1986

[54] FITTING INDICATING MECHANISM IN SCREW TYPE CONNECTOR HOUSINGS

[75] Inventors: Shinichi Kato, Atsugi; Yoji Saito; Hiroshi Umemoto, both of Gotenba, all of Japan

[73] Assignees: Nissan Motor Co., Ltd., Yokohama; Yazaki Corporation, Tokyo, both of Japan

[21] Appl. No.: 620,303

[22] Filed: Jun. 13, 1984

[30] Foreign Application Priority Data

Jun. 17, 1983 [JP] Japan ................................ 58-107728

[51] Int. Cl.[4] ................................................ F16B 31/02

[52] U.S. Cl. ...................................... 403/27; 403/343; 403/405.1; 411/8; 411/14; 116/307; 339/113 R

[58] Field of Search ........................ 403/27, 405.1, 343; 285/93; 339/113 R, 113 B; 411/8, 9, 13, 14; 116/307, 323, DIG. 15

[56] References Cited

U.S. PATENT DOCUMENTS 3,771,108 11/1973 Haffner et al. .................. 339/113 R 3,812,758 5/1974 Bossler, Jr. ........................... 411/14

FOREIGN PATENT DOCUMENTS 916791 3/1982 U.S.S.R. .................................. 411/8

926394 5/1982 U.S.S.R. .................................. 411/8

*Primary Examiner*—Cornelius J. Husar
*Assistant Examiner*—Todd G. Williams
*Attorney, Agent, or Firm*—Armstrong, Nikaido Marmelstein & Kubovcik

[57] ABSTRACT

A new fitting indicating mechanism in screw type connector housings is provided. Said mechanism comprises a male connector housing having an engaging portion; a female connector housing having cavity means for receiving said engaging portion therewithin; a tubular body having a bore contiguous to said cavity means and a plurality of flexible support arms extending into said bore toward a direction opposite to said female connection housing; and an indicator rod held to extend within said cavity means and said bore, said indicator rod being biased toward the male connector housing such that said flexible support arms covers the indicator rod when fitting engagement of both housing connectors is not completed but pushes open said flexible support arms upon completion thereof such that said indicator rod is exposed out the flexible arms.

4 Claims, 3 Drawing Figures

FITTING INDICATING MECHANISM IN SCREW TYPE CONNECTOR HOUSINGS

BACKGROUND OF THE INVENTION

The present invention relates to an indicating mechanism for visually confirming a fitting operation of screw type connector housings.

In ordinary connector housings other than a screw type, the completion of male and females connector housings fitting operation can be fully confirmed by the touch of a hand at the time of engagement. However, since screw type connector housings will not provide sufficient information about complete engagement by the feel, a somewhat extra torque more than necessary is applied for assuring fitting.

However, where the insertion force of terminal fittings in both connector housings is required to be large, the operator can take insufficient engagement for complete and leave the engagement operation halfway. Otherwise, the connector housings can be broken due to excessive tightenning.

SUMMARY OF THE INVENTION

In order to solve the above problems, there is essentially provided a fitting indicating mechanism in screw type connector housings comprising a male connector housing having an engaging portion; a female connector housing having cavity means for receiving said engaging portion therewithin; a tubular body having a bore contiguous to said cavity means and a plurality of flexible support arms extending into said bore; and an indicator rod held to extend within said cavity means and said bore, said indicator rod being biased toward the male connector housing such that said flexible support arms when said male connector housing is not received within said cavity means but pushes open said flexible support arms such that said indicator rod is exposed out the flexible arms.

BRIEF DESCRIPTION OF THE DRAWINGS

The present invention will be fully understood from the following description referring to the accompanying drawings, in which.

DETAILED DESCRIPTION OF THE EMBODIMENTS

Figure 1:
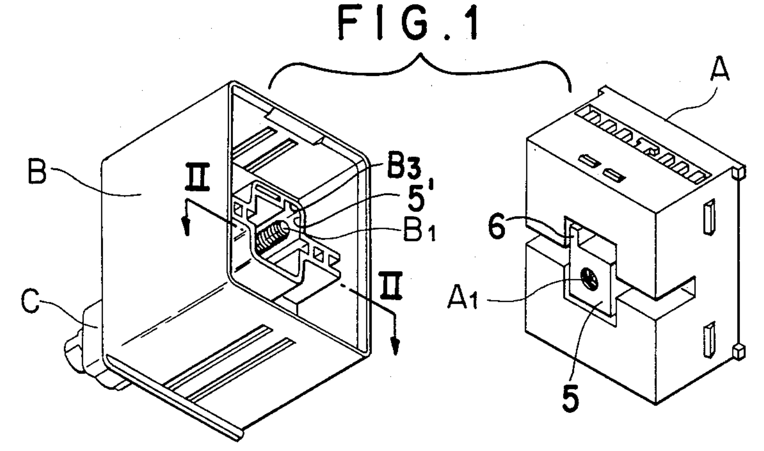
FIG. 1 is a perspective view of screw type male and female connector housings.

An embodiment of the present invention will now be described with reference to the drawings. Referring to FIG. 1, A denotes a male connector housing which may be fixed to a vehicle body or the like which housing has a nut $A_1$ in a central part, and B denotes a removable female connector housing having a bolt $B_1$ in a central portion. C denotes a fitting confirming indicator portion attached to the female connector housing B.

Figure 2:
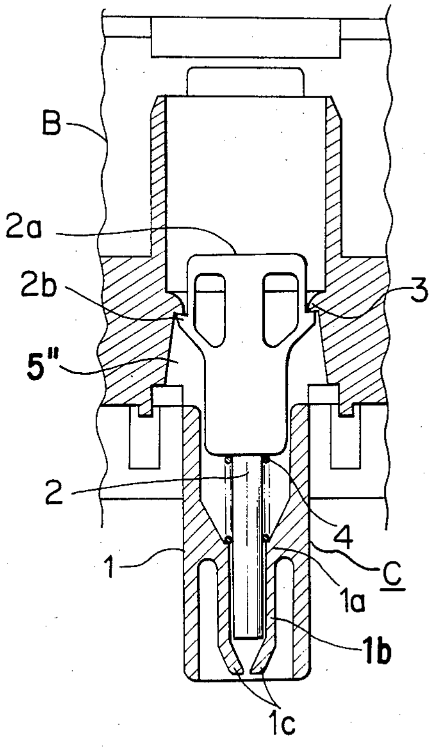
FIG. 2 is a fragmentary sectional view of the female connector housing taken on line II—II of FIG. 1.
Figure 3:
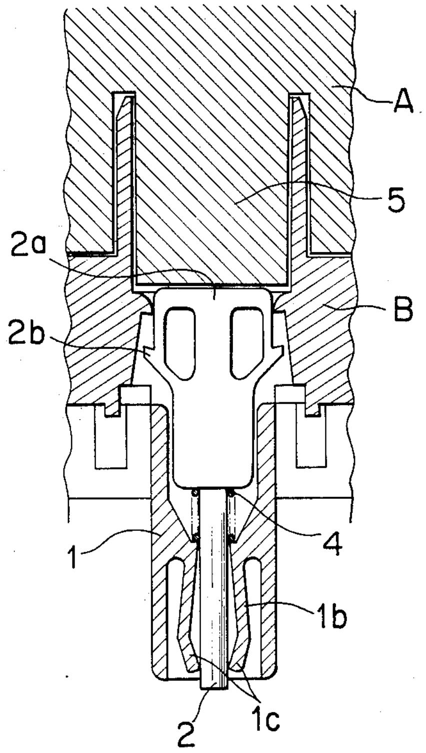
FIG. 3 is a fragmentary sectional view of the male and female connector housing taken on line II—II of FIG. 1, but showing their complete engagement.

Referring to FIGS. 2 and 3, said male connector housing A has an engaging portion 5 whereas said female connector housing B has a first cavity or receiving means 5' to receive said engaging portion 5 and a second cavity 5" to accommodate an indicator rod 2 which will be explained later. To be sure of proper insertion of the engaging portion 5, it has a projection 6 which must extend into the recess $B_3$ of the cavity $B_1$ as may be seen in FIG. 1.

A tubular body 1 having a bore therein is attached to said female connector housing B such that said second cavity of the female connector housing and said bore of the tubular body are aligned and contiguous. There is further provided an indicator rod 2 secured to the body 1 to extend within said second cavity 5" and said bore for axial movement therein. The indicator rod 2 is inserted into the tubular body 1 from the male-connector-housing side thereof. A flexible projection *2b* is formed in a base portion *2a* of the indicator rod in the form of a large diameter section at the fitting side end and brought into engagement with a stepped portion 3 of the connector housing B formed between said first cavity and the second cavity. The projection *2b* is pushed past the stepped portion 3 of the connector housing B on assembly and thereafter prevents the body of the indicator rod from coming out of the fitting side and allow the large diameter section to project in part into the first cavity, thus retaining the body of the indicator rod in the second cavity 5. A spring 4 is provided between the large diameter section of the body of the indicator rod and the tubular body 1 to thereby urge the indicator rod toward the male connector housing.

As shown in FIG. 2 the tubular body 1 is provided a plurality of flexible support arms *1b* extending in said bore toward the direction opposite to the connector housing B, and the indicator rod 2 is supported therein. Shield portions *1c* are provided at outer end portions of the flexible support arms *1b*. In order to facilitate a visual confirmation, the indicator rod 2 and the tubular body 1 and/or connector housing B are differently colored.

If fitting engagement of the first and second connector housings is not completed in the above structure, the indicator rod 2 is in the position shown in FIG. 2 and is covered with the shield portions of the flexible support arms, and cannot be seen from the exterior.

Upon completion of fitting engagement of the male and female connector housings A and B, as shown in FIG. 3, an engaging portion 5 of the male connector housing A pushes the indicator rod 2 against the resistance of the spring 4, so that the small diameter section of the indicator rod 2 pushes open the flexible support arms *1b* and is exposed out beyond the flexible support arms *1b* and the shield portion *1c* to the exterior, thus indicating the completion of the fitting operation.

Since the present invention is constructed as described hereinabove, a complete fitting can be easily confirmed visually by only looking at the back of the removable connector housing instead of looking at the movement of both connector housings being fitted, whereby it is made possible to prevent an incomplete fitting in screw type connector housings or breakage of connector housings, etc. due to excessive screwing.

What is claimed is:

1. A fitting indicating mechanism in screw type connector housings comprising:
   - a first connector housing having an engaging portion;
   - a second connector housing having cavity means for receiving said engaging portion therewithin;
   - a tubular body on said second connector having a bore contiguous to said cavity means and a plurality of flexible support arms extending into said bore in a direction away from said first connector housing; and an indicator rod held to extend within said cavity means and said bore, said indicator rod being biased toward the first connector housing such that said flexible support arms cover the indicator rod when fitting engagement of the first and second connector housings is not completed but pushes open said flexible support arms upon completion of fitting engagement thereof, such that said indicator rod is exposed outwardly of the flexible arms.

2. A fitting indicating mechanism in screw type connector housings according to claim 1, wherein said cavity means includes a first cavity to receive the engaging portion of the first connector housing and a second cavity to accommodate the indicator rod, said second connector housing having a stepped portion between said first and second cavities, said large diameter section having an projection around an intermediate portion thereof to abut against said stepped portion, such that only said large diameter section projects in part into said first cavity.

3. A fitting indicating mechanism in screw type connector housing according to claim 1, wherein said indicator rod has a large diameter section on a male-connector-housing side thereof and a small diameter section on a tubular body side thereof.

4. A fitting indicating mechanism in screw type connector housings according to claim 3, further including a compression spring between said large diameter section and said plurality of flexible support arms.

* * * * *